UNITED STATES PATENT OFFICE.

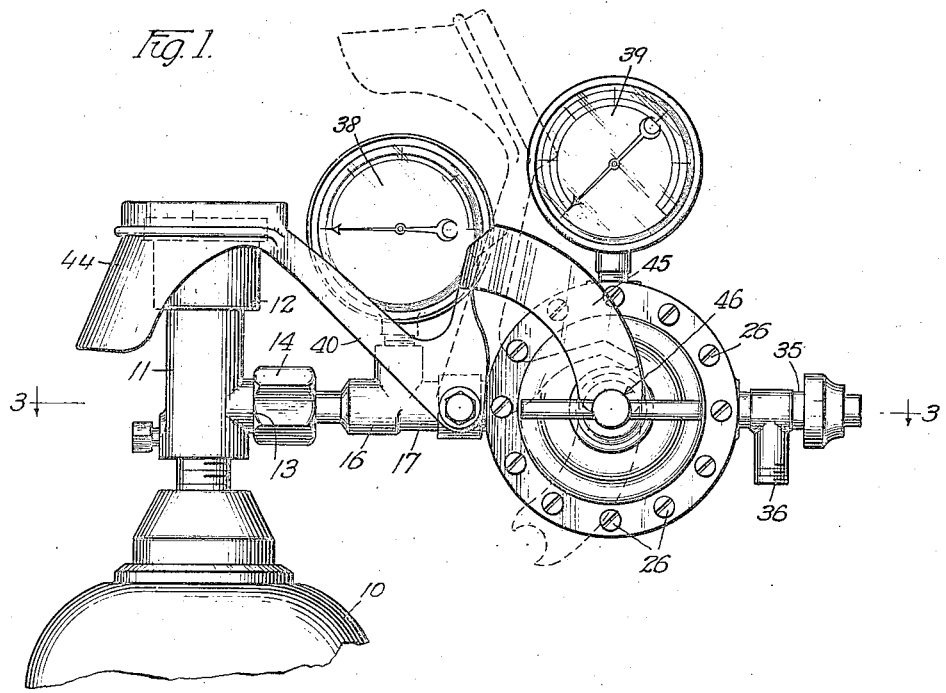
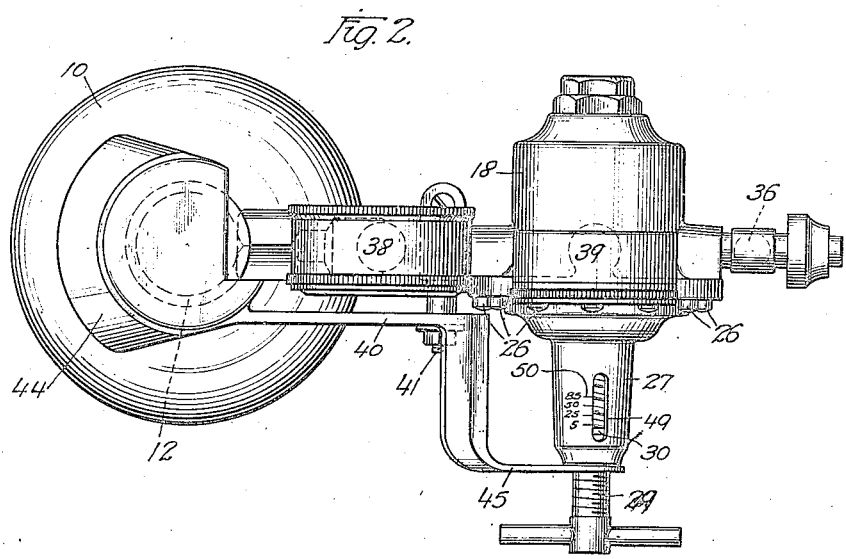

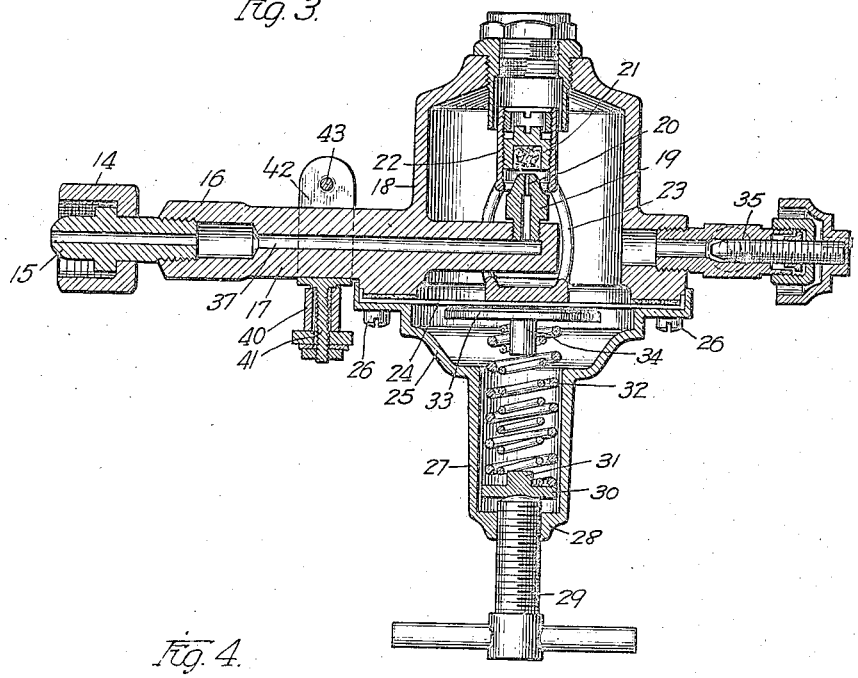
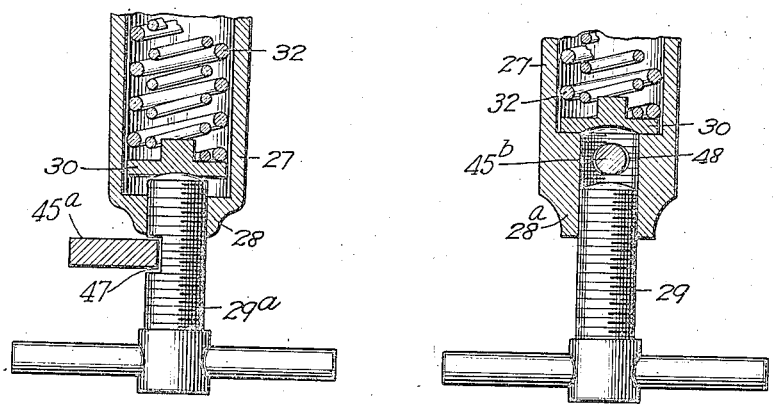

WILLIAM S. NOYES, OF CHICAGO, ILLINOIS.

REDUCING-VALVE APPARATUS.

1,424,846.     Specification of Letters Patent.     Patented Aug. 8, 1922.

Application filed March 8, 1920. Serial No. 364,231.

*To all whom it may concern:*

Be it known that I, WILLIAM S. NOYES, a citizen of the United States, and a resident of Chicago, in the county of Cook and State of Illinois, have invented certain new and useful Improvements in Reducing-Valve Apparatus, of which the following is a full, clear, and exact specification.

My invention is concerned with pressure reducing valves, or "regulators," as they are sometimes called, which are employed to reduce the storage pressure of a gas, such as oxygen, hydrogen or acetylene, in a tank to the working pressure at which it is employed as in a cutting or welding torch, and is designed to compel the proper manipulation of the apparatus so as to prevent possible damage to the reducing valve by improper use thereof.

To this end it consists primarily in the combination with the releasing valve of a storage tank, of an interlocking mechanism coupled with said valve and with the controlling spring of the regulator, so that said spring must be inactive when the releasing valve is opened or closed and the releasing valve must be kept from manipulation when the regulator is in operation.

To illustrate my invention, I annex hereto two sheets of drawings, in which the same reference characters are used to designate identical parts in all the figures, of which—

Fig. 1 is a side elevation of a complete apparatus embodying my invention with the interlocking lever shown in full lines as in position for the operation of the reducing valve, and in dotted lines as in position for the opening or closing of the releasing valve;

Fig. 2 is a top plan view of the apparatus;

Fig. 3 is a longitudinal section, as seen in line 3—3 of Fig. 1, but on a larger scale;

Figs. 4 and 5 are views similar to the lower end of Fig. 3, but illustrating two modifications.

In apparatus of the class described, a storage tank 10 is provided with a releasing valve 11, which in the specific form shown is operated by a cap screw 12 which is turned to open the releasing valve. This releasing valve is provided with a threaded discharge nipple 13 upon which is screwed the internally threaded connection 14 which draws the nipple 15 of the connection into engagement with the nipple 13. The other end of the nipple 15 is threaded into the end 16 of the tube 17 which extends into the generally cylindrical casing 18 of the reducing valve. The inner end of the tube 17, which terminates in the center of the casing 18 is provided with the nipple 19 located centrally of the cylinder and having the very fine aperture 20 therein which co-operates with the closing disk 21 adjustably secured in the internally threaded cylindrical end 22 of the yoke 23 which embraces the end of the tube 17 and has its other end secured to the center of the diaphragm 24 fastened between the open end of the cylindrical casing 18 and the cap 25 secured thereon by the set-screws 26. The cap 25 has the cylindrical extension 27 which has the threaded end 28 into which is screwed the screw-bolt 29 which co-operates with the follower disk 30 which has the lug 31 thereon to hold the helically coiled expanding spring or springs 32 between the disk 30 and the disk 33 centrally secured on the adjacent side of the diaphragm 24 and having the positioning lug 34 thereon to hold the springs 32 in place. The cylinder 18 is provided with the operating valve 35 which has the discharge nipple 36 which will be suitably connected to whatever tool or apparatus the gas is used with.

The operation of the reducing valve which as thus far described, is old and well known, is as follows: With the screw-bolt 29 adjusted so as to relieve the tension of the springs 32, the disk 21 is held by the diaphragm 24 seated against the discharge port of the nipple 19. The releasing valve 12 is then opened, and the gas in the tank, which may have a pressure as high as 2,000 pounds to the square inch, flows through the passage 37 in the tube 17 to the port 20, which is of so small an area that the high pressure of the gas does not serve to lift the disk 21 against the normal tension of the diaphragm 24. The screw bolt 29 is now turned in to an extent that depends upon the pressure to which it is desired to reduce the gas, the unreduced pressure of the gas being shown by the pressure gauge 38 connected with the tube 17, as seen in Fig. 1, and the pressure to which the gas is reduced being shown upon the pressure gauge 39 connected to the top of the cylindrical casing 18. As screw bolt 29 is turned in, the tension of the springs 32 is increased, and this moves the disk 21 off of the nipple 19 until the pressure of the gas flowing into the chamber 18 neutralizes the pressure of the springs 32 and causes the diaphragm to move back to its normal position, which action will occur when the pressure of the gas in the cylinder 18 is the desired pressure to which it is to be reduced.

While the operators of these reducing valves are always instructed to unscrew the bolt 29 to release the spring pressure on the diaphragm before the releasing valve 12 is opened or closed, it sometimes happens that they disobey orders, with the result that the reducing valve is damaged, for the following reasons: If the apparatus is in use, and the releasing valve 12 is closed with the springs 32 still remaining under tension, and the valve 35 is opened, as are the instructions when work is stopped, it will be obvious that the counterbalancing pressure being reduced from the chamber side of the diaphragm, the tension of the springs 32, which may be very high in some cases, so much as 100 pounds to the square inch where oxygen is employed, will remain effective on the diaphragm 24 until the apparatus is used again, with the result that the diaphragm may be deformed by the negligence of the operator, and the reducing valve will never again operate properly until the diaphragm has been replaced.

On the other hand, if the releasing valve 12 is opened with the springs under tension and the disk 21 held some distance from the nozzle 20, there will be a very sudden and very powerful flow of gas at high pressure into the chamber 18, which flow tends to put the diaphragm 24 under very unusual tension suddenly, and thus deform it.

To remedy these difficulties, and prevent the possibility of damaging the apparatus, I have devised interlocking mechanism between the releasing valve 12 and the screw bolt 29, which mechanism preferably takes the form of a lever 40, which is pivoted on a fulcrum 41 projecting from the pipe 17, and which may be integral therewith, but which I have shown as detachably secured thereto by means of the clamp 42 and the nut and bolt 43. One arm of the lever 40 is provided with a cap 44, of such size and shape as to cover the cap screw 12 in the full line position shown, and prevent its manipulation either to open or close the same. The other arm of the lever 40 is provided with a segmental plate 45, which may have the semicircular recess 46 in its end, and which recess is adapted to embrace the screw-bolt 29 immediately adjacent the threaded end 28 when the lever is in the full line position, shown in Fig. 1. In order to move it to the dotted line position, so as to open or close the valve 11, the screw bolt 29 has to be screwed entirely out of the end 28, after which the lever 40 can be swung to the dotted line position in which the valve 11 can be opened or closed. After the valve is opened, for instance, the lever is swung back to the full line position and the screw bolt 29 is screwed back in place and turned up as much as may be necessary to secure the desired pressure in the cylinder 18, as indicated on the pressure gauge 39, after which the apparatus will be used until it is desired to shut it off, when the screw bolt 29 will be screwed out and the lever 40 shoved to the dotted line position and the valve 11 closed.

While I consider the form of interlocking mechanism shown in Figs. 1 and 2 as best adapted for its purpose, it will be understood that it is capable of modifications, such for instance, as that illustrated in Fig. 4, where the plate 45ª is brought closer to the fulcrum of the lever and its outer edge co-operates with a recess 47 which may be cut in one side of the screw bolt 29ª so that the recess 47 will be in register with the plate 45ª when the tension is entirely removed from the springs 32. In the construction shown in Fig. 5, I have employed an arcuate rod 45ᵇ which in the dotted line position of Fig. 1 passes through a slightly elliptical aperture 48 formed in the end 28ª of the tube 27. Obviously, the screw bolt 29 must be screwed out far enough so that the tension of the springs 32 will be entirely released before the rod 45ᵇ can pass through the aperture 48.

Another feature of my invention resides in the auxiliary gauge which I may employ, as shown in Fig. 2, where the tube 27 has the elongated aperture 49 along its axis with the scale 50 graduated on one side thereof and marked to indicate the pressures at which the apparatus is normally designed to operate. One edge of the disk 30 may be considered as the indicator to co-operate with the scale, and it will be obvious that as the bolt 29 is screwed in, the increasing amount of the pressure will be indicated by the disk 30 passing the higher graduations on the scale. This auxiliary gauge is useful in case the gas supply in the tank gets low. If the screw bolt 29 is screwed up higher, and the registration of the gauge 39 does not increase accordingly, it shows at once that the pressure in the tank 10 is below the desired pressure and that another tank is necessary.

While I have shown and described my invention as embodied in the form which I consider best adapted to carry out its purposes it will be understood it is capable of modifications, and that I do not desire to be limited in the interpretation of the following claims, except as may be necessitated by the state of the prior art.

What I claim as new, and desire to secure by Letters Patent of the United States is:

1. In an apparatus of the class described, the combination with a tank, of a releasing valve therefor, a regulator connected with said valve including a spring pressed diaphragm, and interlocking mechanism between said valve and the regulator which compels the release of the spring pressure on the diaphragm before the releasing valve can be operated, for the purpose described.

2. In an apparatus of the class described, the combination with a tank, of a releasing valve therefor, a regulator in which said valve discharges the high pressure gas, said regulator comprising a diaphragm on one side of which the high pressure gas discharges, a coiled spring on the other side, and a screw bolt for regulating the tension of the spring on the diaphragm, and a lever having one end co-operating with the releasing valve and the other with the bolt so that the releasing valve cannot be manipulated while the screw bolt holds the spring under tension.

3. In an apparatus of the class described, the combination with a tank, of a releasing valve therefor, a regulator into which said valve discharges a high pressure gas, said regulator comprising a diaphragm on one side of which the high pressure gas discharges, a coiled spring on the other side, and a screw bolt for regulating the tension of the spring on the diaphragm, and a lever having a cap on one end which covers the releasing valve in one position, and an arcuate locking member on the other end which in the other position of the lever prevents the screw bolt from being moved to its spring tensioning position.

4. In an apparatus of the class described, the combination with a tank, of a releasing valve therefor, a regulator into which said valve discharges a high pressure gas, said regulator comprising a diaphragm on one side of which the high pressure gas discharges, a coiled spring on the other side, and a screw bolt for regulating the tension of the spring on the diaphragm, and a lever having a cap on one end which covers the releasing valve in one position, and an arcuate bar on the other end which in the other position of the lever covers the threaded aperture into which the bolt is screwed.

5. As a new and useful article of manufacture, a lever adapted to be detached to a regulator and shaped so that in one position one end of the lever will co-operate with the releasing valve of a tank to prevent its operation, while in the other position another portion will co-operate with the screw bolt of the regulator to keep it from putting its regulating spring under tension.

In witness whereof, I have hereunto set my hand and affixed my seal, this fifth day of March, A. D. 1920.

WILLIAM S. NOYES. [L. s.]

Witness:
JOHN HOWARD McELROY.